United States Patent Office 3,098,055
Patented July 16, 1963

3,098,055
WATER RESISTANT HALOGENATED COPOLYMERS
Theodore Lemiszka, Roselle, Francis P. Baldwin, Colonia, and Lawrence T. Eby, Linden, N.J., assignors to Esso Research and Engineering Company, a corporation of Delaware
No Drawing. Filed Feb. 20, 1959, Ser. No. 794,505
19 Claims. (Cl. 260—41.5)

This invention relates to water-resistant rubbery polymeric compositions which are halogenated copolymers of isoolefins and multiolefins and to the preparation and vulcanization of such compositions, and more particularly to improved methods for curing halogenated butyl rubber in the substantial absence of added zinc oxide with minor proportions of a combination of a lead oxide such as litharge and an amino compound.

Copolymers of the above general type, especially where the copolymer contains about 85 to 99.5% (preferably about 95 to 99.5%) of a $C_4$ to $C_7$ isoolefin such as isobutylene with about 15 to 0.5% (preferably 5 to 0.5 weight percent) of a multiolefin of about 4 to 14, preferably about 4 to 6 carbon atoms and having a Staudinger molecular weight of between about 20,000 and 300,000, are commonly referred to in patents and literature as "butyl rubber" or GR–I rubber (Government rubber-isobutylene) and, for example, is referred to as "butyl rubber" in textbook "Synthetic Rubber" by G. S. Whitby. The preparation of butyl type rubber is described in U.S. Patent 2,356,128, to Thomas et al. as well as in technical literature. In general, the multiolefinic component of the rubber comprises a conjugated diolefin such as isoprene, butadiene, dimethyl butadiene, piperylene, etc. The reaction product of isobutylene and isoprene is preferred. Butyl rubber has a mole percent unsaturation of between about 0.5 to 15.0.

Halogenated butyl-type rubbery copolymers which may be vulcanized with zinc oxide are produced by halogenating the butyl rubber in a manner which does not degrade the molecular weight thereof, but halogenated sufficiently to produce a rubbery product which, when vulcanized, retains its tensile strength upon heat aging.

It is known that vulcanizates of such halogenated butyl rubber copolymers are useful to insulate electric wire and the like since the halogenated butyl vulcanizates formed combine the proper level of electrical properties with rapid curing. Their only disadvantage is their inability to maintain these desirable electric properties when exposed to water.

In accordance with the present invention, it has now been discovered that moisture pickup is drastically reduced by curing halogenated butyl rubber in the substantial absence of zinc oxide with a combination of a lead oxide and an amino compound.

In practicing the present invention, 100 parts by weight of halogenated butyl rubber are compounded in the substantial absence of added zinc oxide with a combination of about 0.5 to 30, advantageously 1 to 25, and preferably 2 to 20 parts by weight of a lead oxide such as $Pb_2O$, $Pb_2O_3$, $Pb_3O_4$, $PbO_2$ or especially PbO (litharge) and about 0.05 to 20, advantageously about 0.1 to 15, and preferably about 0.5 to 10 parts by weight of an amino compound, with or without the addition of such conventional compounding ingredients as about 0.5 to 10 parts by weight of sulfur, about 15 to 80 parts by weight of a filler such as a carbon black, clay, talc, $TiO_2$, etc., antitack agents, such as stearic acid, antioxidants such as phenyl-beta-naphthylamine, resins, plasticizers, oils, waxes, etc. The resulting compounded stock is then cured by heating the same for about 0.1 minute to 5 hours, advantageously for about 0.5 minute to 3 hours and preferably for about 1.0 minute to 2 hours at a temperature level of between about 200° to 400° F. and preferably at about 250° to 375° F. to produce a vulcanizate having a combination of good electrical properties and resistance to water.

In producing halogenated butyl rubber to be vulcanized in accordance with the present invention, unmodified, unvulcanized butyl rubber is carefully halogenated so as to contain about at least 0.5 weight percent (preferably at least about 1.0 weight percent) combined halogen but not more than about "X" weight percent combined chlorine or 3"X" weight percent combined bromine wherein:

$$X = \frac{M_3 L}{(100-L)M_1 + L(M_2+M_3)} \times 100$$

and:

$L$ = mole percent of the multiolefin in the polymer
$M_1$ = molecular weight of the isoolefin
$M_2$ = molecular weight of the multiolefin
$M_3$ = atomic weight of chlorine or bromine Restated, there should be at least about 0.5 weight percent of combined halogen in the polymer but not more than about one atom of chlorine or 3 atoms (preferably 2) of bromine combined in the polymer per molecule of multiolefin present therein: i.e., not more than about one atom of combined chlorine or three atoms of combined bromine per double bond in the polymer.

Suitable halogenating agents which may be employed are gaseous chlorine, liquid bromine, iodine mono-chloride, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), pyridinium chloride perchloride, N-bromo-succinimide, alpha-chloroacetoacetanilide, tribromophenol bromide, N-chloracetamide, N-bromophthalimide, N,N'-dimethyl-5,5 dichloro or dibromo hydantoin, and other common halogenating agents.

The halogenation is generally conducted at about $-50°$ to about $+150°$ C., advantageously at about $0°$ to $65°$ C., preferably at about $20°$ to $50°$ C. (room temperature being satisfactory), depending upon the particular halogenation agent, for about one minute to several hours. An advantageous pressure range is from about 0.5 to 400 p.s.i.a., atmospheric pressure being satisfactory. The halogenation conditions are regulated to halogenate the rubbery copolymer to the extent above mentioned.

The halogenation may be accomplished in various ways. For instance, the solid copolymer may be halogenated per se with a gaseous, liquid or solid halogenating agent. Another process comprises preparing a solution of the copolymer as above, in a suitable inert liquid organic solvent such as a $C_3$ to $C_{10}$ or preferably a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc., and adding thereto gaseous chlorine, liquid bromine, hydrogen fluoride, iodine mono-chloride, or other halogenating agent, which may optionally be in solution, such as dissolved in any inert hydrocarbon, an alkyl chloride, carbon tetrachloride, etc.

The concentration of the butyl rubber in the solvent will depend upon the type of reactor, molecular weight of the butyl rubber, etc. In general, the concentration of a butyl rubber having a viscosity average molecular weight of about 150,000 to about 1,500,000, if the solvent is a substantially inert hydrocarbon, will be between 1 and 30% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The polymer may be precipitated with acetone or any other known non-solvent for the butyl rubber and dried under about 1 to 760 millimeters or higher of mercury pressure absolute at about 0° to 180° C., preferably at about 50° to 150° C. (e.g., 70° C.). Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 150,000 and 1,500,000 and a mole percent unsaturation of between about 0.5 to 15.0, preferably about 0.6 to 5.0.

The amino compounds useful for the purposes of the present invention fall into three general categories, the members of which may be used individually or in combination:

(1) Those compounds having a single —$NH_2$ group and/or those that form such group in situ under vulcanization conditions;

(2) Those compounds having at least two —$NH_2$ groups and/or those that form such groups in situ under vulcanization conditions; and (3) Those compounds having at least one

group, or at least one

group and at least one —$NH_2$ group, and/or those that form such groups in situ under vulcanization conditions.

Suitable amino compounds of category (1) for the purposes of the present invention include, among others, $C_4$ to $C_{24}$, preferably $C_8$ to $C_{18}$ monofunctional primary amines boiling above about 250° F. such as aldehyde amine reaction products such as the reaction product of butyraldehyde and aniline; hexylamines; octylamines; decylamines; hexadecylamines; dodecylamines; dimethyl pentylamines; pentamethyl hexylamines; methyl octylamines; diethyl heptylamines; 9-hexadecylamine; naphthylamines; hydrogenated naphthylamines; alkyl or aryl amines such as phenylanilines, ethyl anilines; tertiary butyl anilines; other substituted anilines such as toluidines; the formaldehyde-p-toluidine reaction product; phenyl alkylamines such as alpha or beta phenyl ethylamine; 2,4,6-trimethyl aniline, mixtures thereof, etc.

The amino compounds of category (2) employed in accordance with the invention include, among others, $C_4$ to $C_{24}$, preferably $C_4$ to $C_{12}$ polyfunctional amines boiling above 250° F. such as diethylene triamine; triethyl trimethylene triamine; polymethylene diamines including tetramethylene diamine or hexamethylene diamine; diamino propane; diamino cyclohexane; phenylene diamine; diphenyl guanidine; diorthotolyl guanidine; benzidine and other diamino biphenyls; 4,4'-diamino diphenyl methane; 2,6-diamino pyridine; diamino naphthalenes; triamino benzenes; xylyl diamines; 3,3'-imino bispropylamine; melamine (i.e. 2,4,6-triamino triazine); N-alkylmelamines; etc.

Suitable amino compounds of category (3) for the purposes of the present invention include, among others, $C_4$ to $C_{24}$, preferably $C_4$ to $C_{12}$ polyfunctional imines boiling above about 250° F. such as alkylene thioureas such as 2-mercaptoimidazoline (i.e. ethylene thiourea); hexamethylene tetramine, N-cyclo-hexyl-2-benzothiazole sulfenamide; tetra ethylene pentamine, N,N'-diallylmelamine; N,N'-diethyl hexamethylene diamine; N,N'-dimethyl p-phenylene diamine; N-alkyl diamines such as N-methyl pentamethylene diamine; 3-alkylamino-3'-iminobisalkylamines such as 3-ethylamino-3'-iminobispropylamine; N-alkyl phenylene diamines such as N-methyl phenylene diamine, etc.

In order to more fully illustrate the present invention the following experimental data are given:

EXAMPLE I 100 parts by weight of an isobutylene-isoprene brominated butyl rubber having a Mooney viscosity (212° F. for 8 minutes) of 57, a mole percent unsaturation of 0.88, a viscosity average molecular weight of 390,000, and a combined bromine content of 2.40 were compounded with 50 parts by weight of HAF carbon black, 1.0 part by weight of stearic acid and with either 5 parts by weight of zinc oxide as a control or, in accordance with the present invention, with an admixture of 10 parts by weight of PbO (litharge) and 1 part by weight of the condensation product of butyraldehyde and aniline (Accelerator 808), with the following results when cured for 60 minutes at 307° F. upon immersion of 6 x 6 x .075 inch pads of the vulcanizates in boiling water:

| Days of Immersion | Weight Percent of Water Pickup | |
|---|---|---|
| | Zinc Oxide Recipe | Water-Resistant Recipe |
| 1 | 2.4 | 1.1 |
| 2 | 4.6 | 1.5 |
| 3 | 5.7 | 2.0 |
| 4 | 6.5 | 2.0 |
| 7 | 8.6 | 2.4 |

*Physical Properties of Water-Resistant Cured Stock*

| | 100% Modulus (p.s.i.) | Tensile Strength (p.s.i.) | Elongation, percent |
|---|---|---|---|
| Original | 360 | 1,310 | 330 |
| After immersion in water for 7 days | 540 | 1,725 | 220 |

The above data show that brominated butyl rubber cured in accordance with the present invention in the absence of zinc oxide with an admixture of a lead oxide and an amino compound is much more resistant to water than the control. Also, the physical properties of the water-resistant stock, cured in accordance with the present invention, were actually improved as shown by an increase in both extension modulus and tensile strength after immersion in boiling water for 7 days.

EXAMPLE II

The same general procedure as in Example I was repeated except the zinc oxide cure was in the presence of 2 parts by weight of sulfur and 1.0 part by weight of the accelerator, tellurium diethyl dithiocarbamate, whereas the litharge-amino cure was in the presence of 2 parts by weight of sulfur. The following data were obtained:

| Days of Immersion | Weight Percent of Water Pickup | |
|---|---|---|
| | ZnO-Sulfur Recipe | Water-Resistant Sulfur Recipe |
| 1 | 3.10 | 1.34 |
| 2 | 4.38 | 1.50 |
| 3 | 5.29 | 1.79 |
| 4 | 6.19 | 1.97 |
| 7 | 8.33 | 2.59 |

*Physical Properties of Water-Resistant Sulfur Cured Stock*

|  | 100% Modulus (p.s.i.) | Tensile Strength (p.s.i.) | Elongation (percent) |
| --- | --- | --- | --- |
| Original | 640 | 2,500 | 250 |
| After immersion in water for 7 days | 710 | 2,510 | 235 |

The same general comments apply as in Example I with the added notation that the benefits of the present invention are obtained regardless of whether there is used a non-sulfur-cure or a sulfur-cure of the halogenated butyl rubber.

EXAMPLE III

The same general procedure as in Example I was repeated except that 1.0 part by weight of the antioxidant 2,2′-methylene bis(4-methyl-6-tertiary butyl phenol) was substituted for the stearic acid anti-tack agent, both the zinc oxide recipe and the water resistant recipe containing also 2.0 parts by weight of added diethylene triamine. The results obtained were as follows:

| Hours of Immersion in Boiling Water | Weight Percent of Water Pickup | |
| --- | --- | --- |
| | Triamine-Zinc Oxide Recipe | Triamine Water Resistant Recipe Containing a Lead Oxide |
| 24 | 2.7 | 1.4 |
| 96 | 5.9 | 2.4 |
| 120 | 6.6 | 2.6 |
| 142 | 7.3 | 2.8 |

The above data show that a triamine-zinc oxide cured halogenated butyl recipe exhibits poor resistance to water, but that by omitting the zinc oxide and substituting a lead oxide therefor, excellent water resistance of halogenated butyl rubber is obtained.

EXAMPLE IV

A chlorinated butyl rubber was compounded exactly as in Example III. The chlorinated butyl rubber was an isobutylene-isoprene copolymer having a Mooney viscosity (212° F. for 8 minutes) of 65, a mole percent unsaturation of 1.3, a viscosity average molecular weight of 475,000 and a combined chlorine content of 1.1. The data were as follows:

| Hours of Immersion in Boiling Water | Weight Percent of Water Pickup | |
| --- | --- | --- |
| | Triamine-Zinc Oxide Recipe | Triamine-Lead Oxide Recipe |
| 24 | 2.1 | 1.5 |
| 96 | 4.3 | 2.8 |
| 120 | 4.8 | 3.1 |
| 142 | 5.3 | 3.3 |

*Physical Properties of Water-Resistant Cured Stock*

|  | 300% Modulus (p.s.i.) | Tensile Strength (p.s.i.) | Elongation (percent) |
| --- | --- | --- | --- |
| Original | 1,515 | 2,315 | 275 |
| After immersion in water for 142 hrs. at 212° F. | 1,990 | 2,185 | 220 |

The same general comments apply as in Example III. Resort may be had to modifications and variations of the disclosed embodiments without departing from the spirit of the invention or the scope of the appended claims.

What is claimed is:

1. A composition comprising a major proportion of a rubbery halogenated copolymer of about 85 to 99.5 weight percent of a $C_4$ to $C_7$ isoolefin and about 15 to 0.5 weight percent of a $C_4$ to $C_{14}$ multiolefin and vulcanizing amounts of a combination of lead oxide and a nitrogen compound selected from the group consisting of $C_4$ to $C_{24}$ monofunctional primary amines, $C_4$ to $C_{24}$ polyfunctional amines, and $C_4$ to $C_{24}$ polyfunctional imines, said composition being free of zinc oxide and said halogenated copolymer containing between about 0.5 wt. percent of combined halogen based on the copolymer and an amount of combined halogen selected from the group consisting of not more than about one atom of chlorine per double bond in the copolymer and not more than about 3 atoms of bromine per double bond in the copolymer.

2. A composition according to claim 1 in which the halogenated copolymer contains at least 0.5 weight percent chlorine but not more than about one atom of chlorine per double bond in the copolymer.

3. A composition according to claim 1 in which the halogenated copolymer contains at least about 0.5 weight percent bromine but not more than about three combined atoms of bromine per double bond in the copolymer.

4. A composition according to claim 1 in which the lead oxide is present in an amount of between about 0.5 and 30 weight percent based on halogenated copolymer, the amount of added nitrogen compound being about 0.05 to 20 weight percent on the same basis.

5. A composition according to claim 1 in which the nitrogen compound is a condensation product of aniline and butyraldehyde.

6. A composition according to claim 1 in which the nitrogen compound is diethylene triamine.

7. A composition according to claim 1 in which the nitrogen compound is ethylene thiourea.

8. A composition according to claim 1 in which the nitrogen compound is a benzothiazole sulfenamide.

9. A composition according to claim 1 in which the lead oxide is PbO.

10. A composition according to claim 1 in which the lead oxide is $Pb_2O$.

11. A composition according to claim 1 in which the lead oxide is $Pb_2O_3$.

12. A composition according to claim 1 in which the lead oxide is $Pb_3O_4$.

13. A composition according to claim 1 in which the lead oxide is $PbO_2$.

14. A composition according to claim 1 which has been vulcanized by heating the same for between about 0.1 minute and 5 hours at a temperature level of between about 200° and 400° F. to produce a vulcanizate having good electrical properties and increased resistance to wear.

15. A composition comprising a rubbery polymer having a viscosity average molecular weight of at least about 100,000 comprising atoms of hydrogen, carbon and halogen, containing in its structure a major proportion of hydrocarbon units derived by the polymerization of isoolefins containing about 4 to 7 carbon atoms and also containing sufficient units of a $C_4$ to $C_6$ multiolefin in which a pair of carbon atoms is linked by an olefinic double bond that the mole percent unsaturation is between about 0.5 and 15; said polymer containing at least about 0.5 weight percent halogen but not more than about one combined atom of halogen per double bond in the polymer; said polymer being in composition with a combination of about 0.5 to 30 wt. percent of lead oxide and about 0.1 to 15 wt. percent of a nitrogen compound selected from the group consisting of $C_4$ to $C_{24}$ monofunctional primary amines, $C_4$ to $C_{24}$ polyfunctional amines, and $C_4$ to $C_{24}$ polyfunctional imines; said composition being free of zinc oxide.

16. A composition according to claim 15 in which the polymer is also in composition with about 15 to 80 parts by weight of a filler per 100 parts by weight of polymer.

17. A composition according to claim 16 which has been vulcanized for between about 1.0 minute and 2.0 hours at a temperature level of between about 275° and 375° F.

18. A process which comprises vulcanizing halogenated butyl rubber, said butyl rubber being a copolymer of 85 to 99.5% of a $C_4$ to $C_7$ isoolefin and 15 to 0.5% of a $C_4$ to $C_{14}$ multiolefin, in the presence of an admixture of about 0.5 to 30.0 weight percent of lead oxide and about 0.1 to 15.0 weight percent of nitrogen compound selected from the group consisting of $C_4$ to $C_{24}$ monofunctional primary amines, $C_4$ to $C_{24}$ polyfunctional amines, and $C_4$ to $C_{24}$ polyfunctional imines, at a temperature level of about 200° and 400° F. for between about 0.5 minutes and 2 hours, said mixture being free of zinc oxide.

19. A process according to claim 18 in which the halogenated butyl rubber contains a halogen selected from the group consisting of chlorine, bromine and mixtures thereof.

References Cited in the file of this patent

UNITED STATES PATENTS

| | | |
|---|---|---|
| 2,393,321 | Haworth | June 22, 1946 |
| 2,524,977 | Holbrook | Oct. 10, 1950 |
| 2,557,641 | Dudley | June 19, 1951 |
| 2,631,984 | Crawford et al. | Mar. 17, 1953 |
| 2,666,753 | Zapp | Jan. 19, 1954 |
| 2,732,354 | Morrissey et al. | Jan. 24, 1956 |
| 2,891,595 | Kuntz et al. | June 23, 1959 |
| 2,892,806 | Moore | June 30, 1959 |
| 2,964,489 | Baldwin et al. | Dec. 13, 1960 |